April 18, 1950     H. JEANNERET     2,504,693
LEVER ESCAPEMENT FOR TIMEPIECES

Filed Feb. 6, 1946

Inventor
H. Jeanneret
By Glascock Downing Seebs Attys.

Patented Apr. 18, 1950

2,504,693

UNITED STATES PATENT OFFICE 2,504,693

LEVER ESCAPEMENT FOR TIMEPIECES

Henri Jeanneret, La Chaux-de-Fonds, Switzerland, assignor to Les Fabriques d'assortiments reunies, Le Locle, Switzerland Application February 6, 1946, Serial No. 645,812
In Switzerland February 12, 1945

2 Claims. (Cl. 58—116)

This invention relates to improvements in lever escapements.

The friction occurring between the escapement wheel and the pallet stones of the lever is important and requires lubrication. In the course of time, the teeth of the escapement wheel trace a path on the surface of the pallet stones, lined by an oil thread whose surface becomes dry in the end. This results in an increase of work of the escapement and, in consequence, in slowness of the movement to which the escapement belongs.

The object of the invention is a lever escapement with an escapement wheel of new design allowing better utilization of the oil film covering the surface of the pallet stones. It is characterized in that the teeth of the escapement wheel are formed in such a way that they make contact one after another with surface parts of the pallet stones of the lever, which are displaced with regard to one another in the direction of width of these pallet stones.

In order to reach this aim, the teeth may be chamfered, however, not all towards the same side, but alternately towards the one and the other side face of the escapement wheel. The chamfer of the teeth may either extend over more or over less than half the width of the teeth. Unilaterally chamfered teeth of the escapement wheel may alternate with teeth chamfered on both sides.

The accompanying drawings illustrate, by way of example, different embodiments of the escapement wheel according to the invention.

Figure 1:
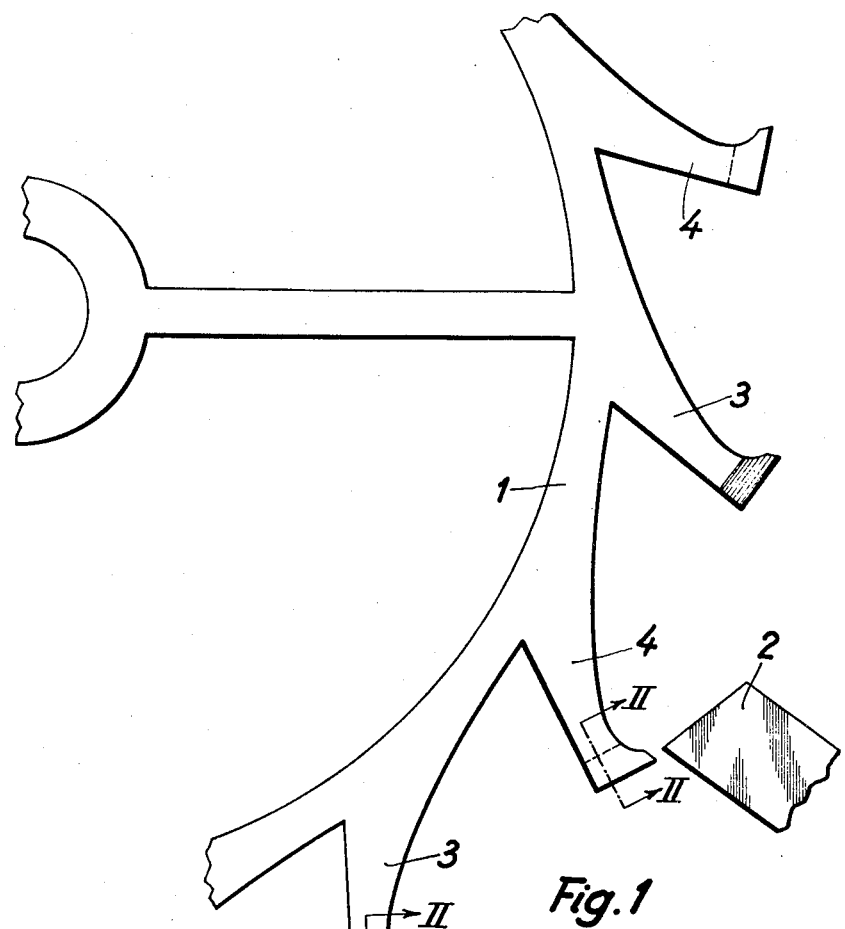
Fig. 1 is a plan view of the first embodiment and of a pallet stone of the lever cooperating with the escapement wheel.
Figure 2:
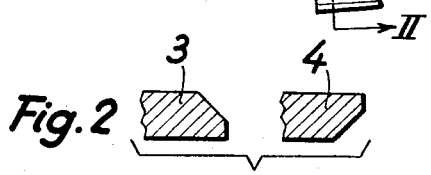
Fig. 2 is a partial section of two teeth of the escapement wheel along line II—II in Fig. 1.

Referring now to Figs. 1 and 2, the escapement wheel is designated by 1 and the pallet stone of the lever by 2. The escapement wheel 1 has a circular series of teeth, each having at its end an impulse face of substantially greater length than width, all of the teeth being in alignment with one another in the same plane. As shown in Fig. 2, the ends of teeth 3, 4 of the escapement wheel 1 are chamfered, tooth 3 towards the one, tooth 4 towards the opposite side to provide pallet-engaging impulse faces which are of lesser width than the thickness of the teeth and are disposed respectively on opposite sides of the center line of the teeth. In the embodiment of Fig. 2 the width of the chamfered part is greater than half the total width of the teeth. From the above it follows that the surface strips along which adjacent teeth make contact with the pallet stone are, in the direction of the width of the later, displaced wih regard to each other. A small oil thread on the surface of the pallet stone is thus alternately displaced by adjacent teeth of the escapement wheel into opposite directions. This oil thread is thus brought by each tooth within reach of the following tooth, so that the lubricating conditions are considerably improved and better use is made of the oil film. This effect is enhanced by the fact that the outer corner of the tooth is square while the inner corner is chamfered. The chamfered surface forms an acute angle with the face of the pallet and, through the action of surface tension, tends to attract more oil to the inner edge than to the outer edge of the tooth. The oil is thus shifted back and forth from the path of one tooth to that of a succeeding tooth so that the portion of the pallet engaged by the teeth is continually lubricated. The accurate running of the timepiece is thereby maintained.

Figure 3:
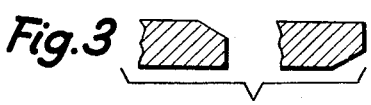
Fig. 3 is an analogous section through two teeth of a second embodiment.

In the tooth shown in Fig. 3, the width of the non-chamfered portion is greater than in Fig. 2. The movements imparted to the oil thread in the direction of the width are for this reason more efficacious than in the first example.

Figure 4:
Fig. 4 shows a similar section through three teeth of a third example.
Figure 5:
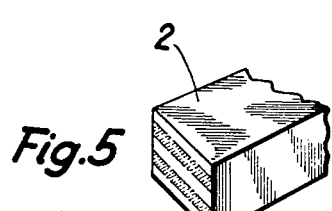
Fig. 5 is a partial view of a pallet stone with hatched surface strips along which the teeth shown in Fig. 2 make contact with the pallet stone.
Figure 6:
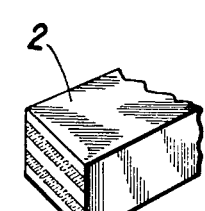
Fig. 6 is a view similar to Fig. 5, but of a pallet stone cooperating with teeth according to Fig. 4.

Another manner of disposing the chamfers of adjacent teeth is illustrated in Fig. 4. Between two teeth chamfered on opposite sides, lies a tooth with chamfers on either side. In this way, a still more accentuated lateral movement of the oil threads formed on each side of the double-chamfered tooth is obtained. The three surface strips along which the teeth make contact with the pallet stone are illustrated by hatched parts between dotted lines in Fig. 6.

Besides the considerable improvements in lubrication, there resides another advantage in the fact that, even in the case of apparatus wherein the escapement is extremely charged, the life of the pallet stones is considerably augmented. Indeed, in the case of teeth of usual construction, a groove is gradually traced into the pallet stones, finally impairing the good running of the escapement. It is understood that when the contact surface of the pallet stone changes from tooth to tooth, the specific wear is considerably diminished.

What I claim is:

1. In a lubricated watch escapement for a precision timepiece, the combination, with a lever having pallets, of an escapement wheel having a circular series of teeth all of which are in alignment with one another in the same plane, the ends of recurring selected ones of said teeth being chamfered at one side and recurring intervening ones of said teeth being chamfered at the opposite side to provide pallet-engaging impulse faces which are of lesser width than the thickness of the teeth and are disposed respectively at opposite sides of the center line of said teeth, whereby the impulse faces of said teeth engage the pallet along different paths within the thickness of the teeth so that lubricant on the pallet displaced by the impulse face of one tooth is in the path of the impulse face of a following tooth.

2. In a lubricated watch escapement for a precision timepiece, the combination, with a lever having pallets, of an escapement wheel having a circular series of teeth, each having at its end an impulse face of substantially greater length than width, all of said teeth being aligned with one another in the same plane, the ends of alternate teeth being chamfered at one side and the ends of intervening teeth being chamfered at the opposite side to provide pallet-engaging surfaces which are of a width approximately half the thickness of the teeth and are disposed alternately at opposite sides of the center line of the teeth, whereby lubricant on the pallet is displaced by the elongated impulse faces of alternate teeth into the path of the impulse faces of the intervening teeth.

HENRI JEANNERET.

REFERENCES CITED

The following references are of record in the file of this patent:

UNITED STATES PATENTS

| Number | Name | Date |
|---|---|---|
| 2,133,216 | Taliaferro | Oct. 11, 1938 |

FOREIGN PATENTS

| Number | Country | Date |
|---|---|---|
| 589,309 | France | Feb. 19, 1925 |